US008558812B2

(12) United States Patent
Asabu et al.

(10) Patent No.: US 8,558,812 B2
(45) Date of Patent: Oct. 15, 2013

(54) PORTABLE TERMINAL DEVICE

(75) Inventors: Hiroko Asabu, Daito (JP); Minako Tani, Daito (JP)

(73) Assignee: Kyocera Corporation, Kyoto (JP)

( * ) Notice: Subject to any disclaimer, the term of this patent is extended or adjusted under 35 U.S.C. 154(b) by 850 days.

(21) Appl. No.: 12/675,396

(22) PCT Filed: Aug. 27, 2008

(86) PCT No.: PCT/JP2008/065263
§ 371 (c)(1),
(2), (4) Date: Feb. 25, 2010

(87) PCT Pub. No.: WO2009/028533
PCT Pub. Date: Mar. 5, 2009

(65) Prior Publication Data
US 2010/0214241 A1    Aug. 26, 2010

(30) Foreign Application Priority Data
Aug. 31, 2007   (JP) .................................. 2007-225134

(51) Int. Cl.
*G06F 3/045* (2006.01)
(52) U.S. Cl.
USPC .......................................... 345/174; 345/175
(58) Field of Classification Search
USPC .................... 345/173–179; 178/18.01–18.07, 178/20.01–20.04
See application file for complete search history.

(56) References Cited

U.S. PATENT DOCUMENTS 7,622,685 B2 *  11/2009  Miyaoka ....................... 174/542
2009/0295731 A1 *  12/2009  Kim et al. ..................... 345/168

FOREIGN PATENT DOCUMENTS

| JP | 2000-278391 | 10/2000 |
| JP | 2002-252689 | 9/2002 |
| JP | 2004-078888 | 3/2004 |
| JP | 2005-321915 | 11/2005 |

OTHER PUBLICATIONS

Inernational Search Report for PCT/JP2008/065263, mailed on Nov. 25, 2008, 1 page.

* cited by examiner

*Primary Examiner* — Vijay Shankar
(74) *Attorney, Agent, or Firm* — Duane Morris LLP

(57) ABSTRACT

A communication terminal device with which a desired function can be found easily and the function can be activated quickly is provided.
A communication terminal device of this invention comprises a housing 8 provided with a display 5, and a touch panel input unit 6 arranged covering a screen of the display 5, and is capable of executing one operation mode selected by a user from a plurality of operation modes. A scroll line 9 is displayed on the screen of the display 5, the scroll line 9 is moved to select one operation mode correlated to the position of the scroll lines 9 in accordance with user's scroll operation, then the selected one operation mode is fixed in accordance with user's mode fixing operation, and a predetermined process of the operation mode is executed in accordance with an operation of an operation key displayed in the operation area.

9 Claims, 8 Drawing Sheets

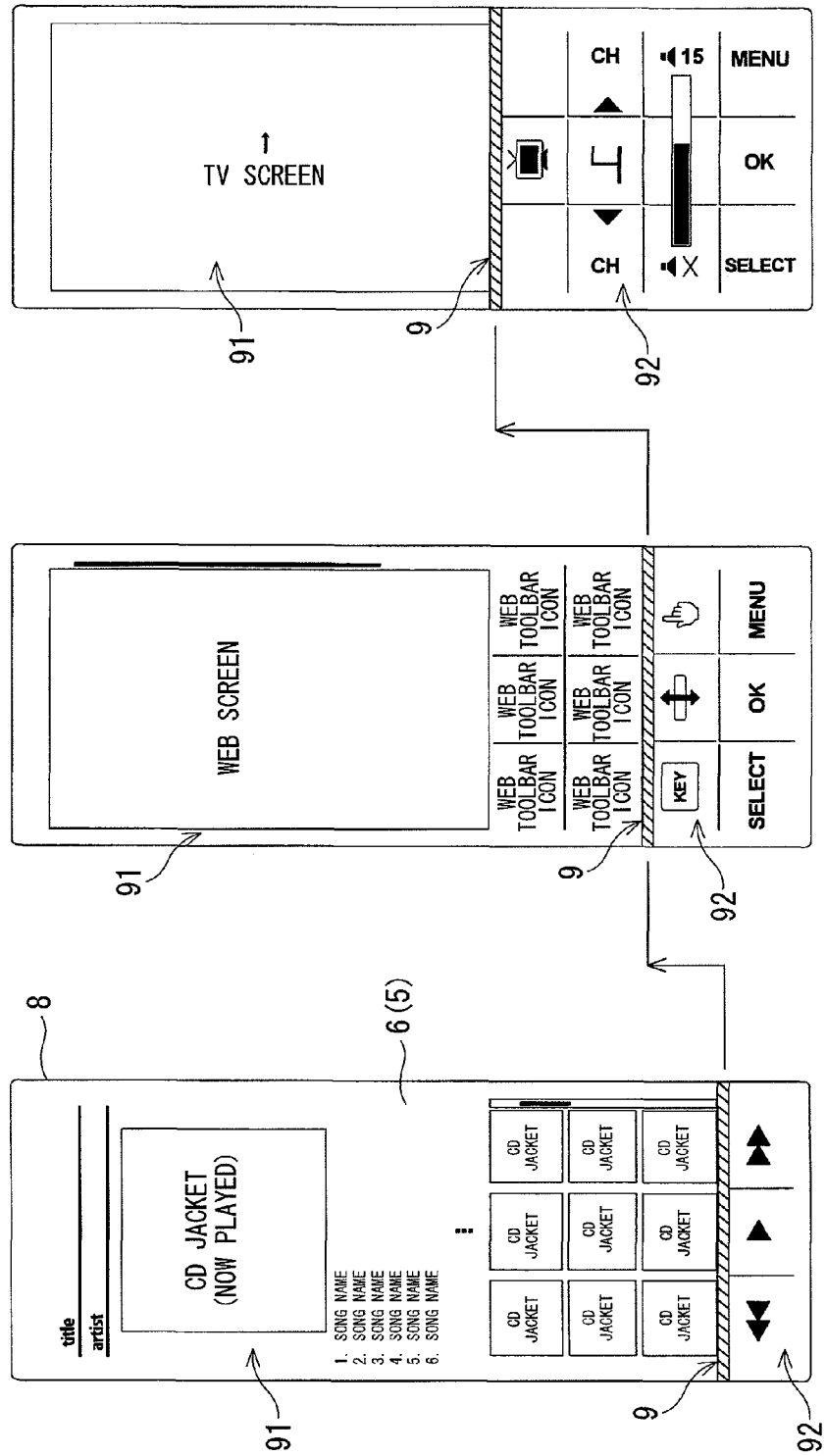

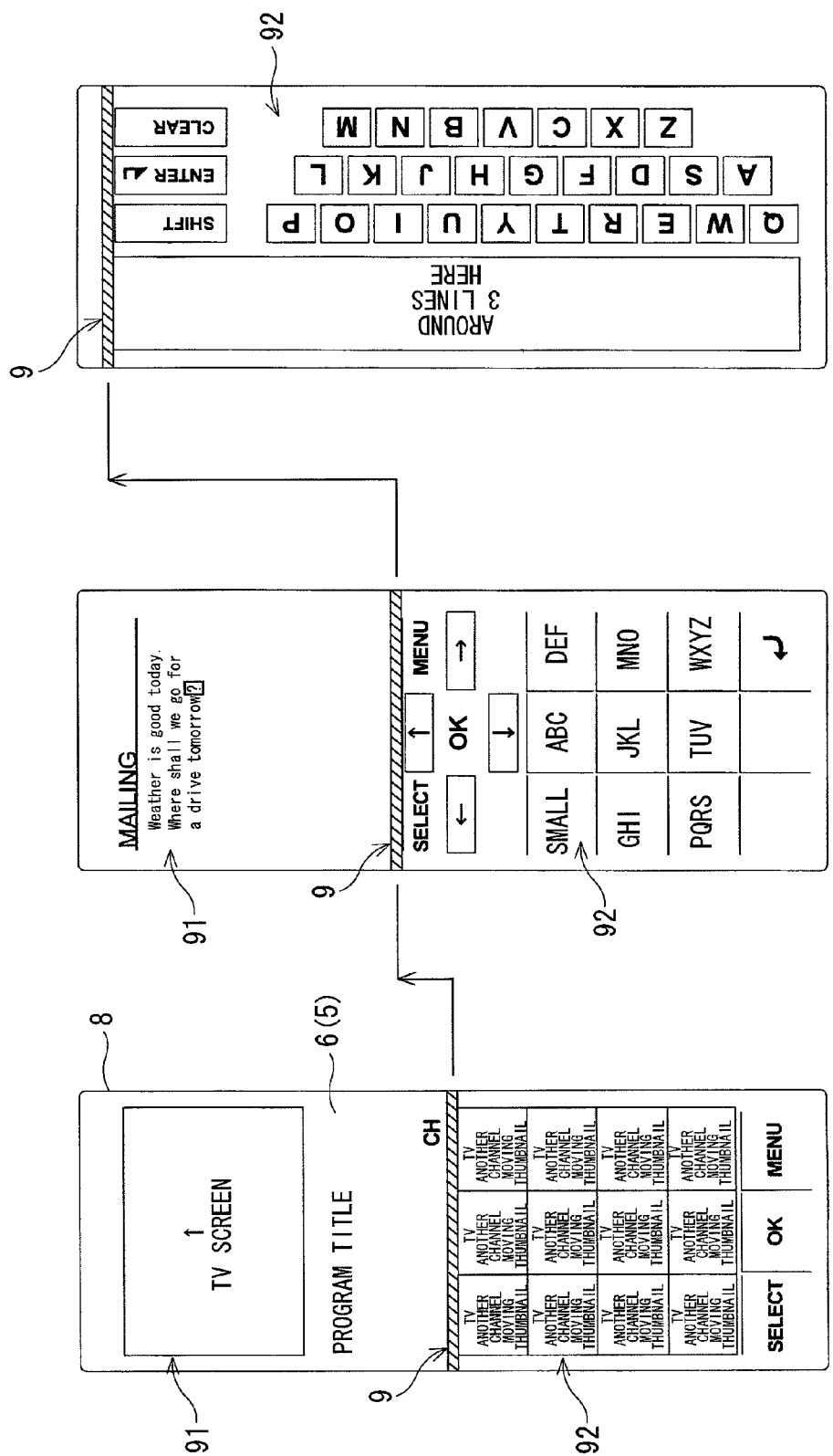

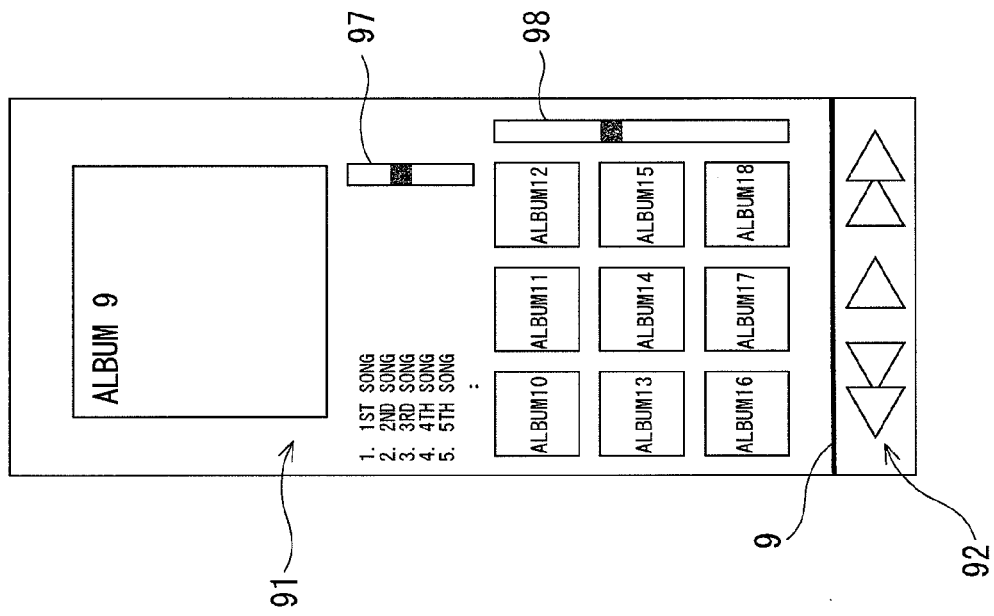
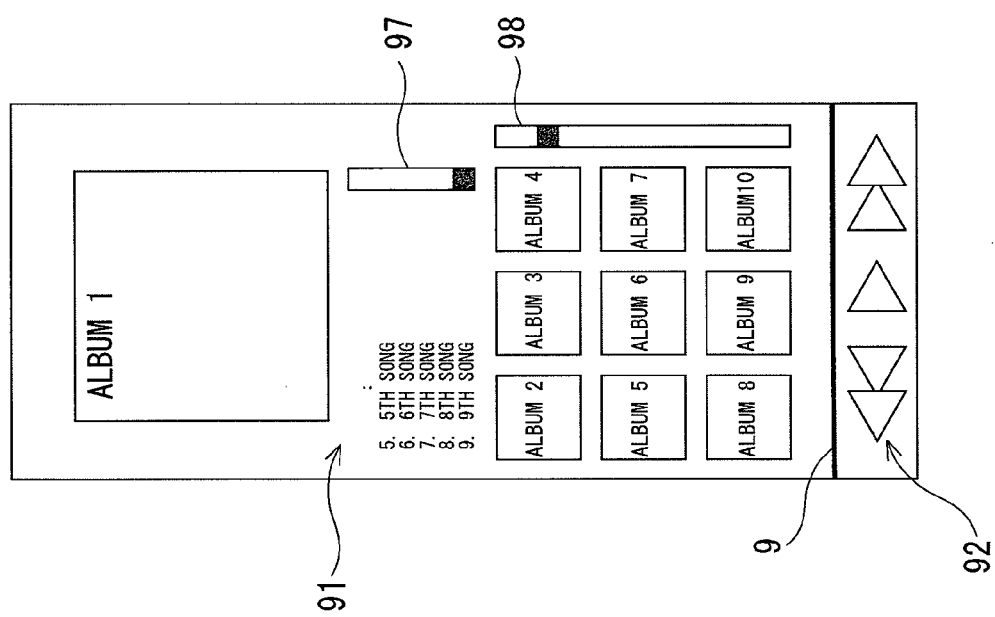

PORTABLE TERMINAL DEVICE

This is a U.S. National Phase Application of International Application No. PCT/JP2008/065263 filed Aug. 27, 2008, which claims priority to Japanese Patent Application No. 2007-225134 filed Aug. 31, 2007, the disclosures of which are incorporated herein by reference in their entirety.

TECHNICAL FIELD

The present invention relates to portable terminal devices such as a portable telephone or the like, and particularly to a portable terminal device with a user interface with good operability.

BACKGROUND ART

In recent years, portable telephones have been multifunctionalized and are equipped with many functions including a TV screen display function, a music playback function, a website display function and the like, as well as a telephone function and an e-mail function.

However, with such a multi-functionalization, the number of operations to be required for a user to activate one desired function (operation mode) has increased more and more, and there has been a problem of deteriorating operability.

Therefore, there have been various proposals such as a portable telephone having a handwriting input function to improve the operability, a telephone including an operation part provided to a hinge section of two housings so that an operation of the operation part enables a search of address information of a communication partner, and the like.

DISCLOSURE OF THE INVENTION

Problems to be Solved by the Invention

However, in the conventional telephones, only a menu which lists names or icons of the functions is displayed on a display in order for the user to select one function, and specifically how the selected function works cannot be recognized unless it is activated. Therefore, there has been a problem that it is difficult to find one desired function and it takes time to activate the desired function.

An object of the present invention is to provide a communication terminal device with which a desired function (operation mode) can be found easily and the function can be activated quickly.

Means for Solving the Problem

A communication terminal device according to the present invention, which includes a housing provided with a display arranged therein and a light-transmitting touch panel input unit arranged so as to cover a screen of the display, and is capable of executing one operation mode selected by a user from a plurality of operation modes, comprises:

scroll line displaying means for displaying on the screen of the display a scroll line extending in one direction on the screen and moving the scroll line in accordance with a scroll operation by a user in a direction crossing the one direction;

mode selection control means for selecting one operation mode correlated to a position of the scroll line from the plurality of operation modes in accordance with the scroll operation by the user, and forming a display area and an operation area with the scroll line serving as a boundary line therebetween on the screen of the display so as to display in the display area an initial screen of one selected operation mode, while to display in the operation area one or more operation keys to be used in said operation mode; and mode execution control means for fixing one selected operation mode in response to a mode fixing operation by the user made in a state where one operation mode is selected, executing a predetermined process of the operation mode in response to an operation of an operation key displayed in the operation area, and displaying an operation screen in the display area.

In the portable terminal device according to the present invention described above, by performing the scroll operation to move the scroll line displayed on the screen of the display in one direction, one operation mode which is preliminarily correlated to the position of the scroll line is selected sequentially, and the initial screens of the plurality of operation modes, e.g., operation images (still images or moving images) at the time of the mode selection are displayed and switched in the display area of the screen.

Therefore, the user performs the mode fixing operation at the time the initial screen of the desired operation mode is displayed. The operation mode is thereby activated. In the operation mode, the operation mode is executed in response to a press of the operation key displayed in the operation area of the screen.

Thus, the user can find the desired operation mode visually while watching the initial screens of the plurality of operation modes, and activate the desired operation mode quickly.

In a particular configuration, the scroll line can be moved to a plurality of mode selection positions set preliminarily on the screen of the display, and the mode selection control means provides a visual difference between display state of the scroll line when the scroll line reaches one mode selection position and display state of the scroll line moving between the mode selection positions.

Here, the visual difference of the display states means magnitude of brightness, presence of blinking, color difference, difference in thickness of a light emitting line, and the like, and it is a concept to be determined in a relative relationship with the display state (magnitude of brightness, presence of gradation treatment, and the like) of the screen other than the scroll line, and includes all difference of display states with which a user can visually distinguish the moving scroll line and the scroll line which has reached the mode selection position or a position close thereto.

The user can thereby recognize that the scroll line has reached the predetermined mode selection position.

For example, the scroll line emits light when the scroll line reaches one mode selection position, and the scroll line stops emitting light during moving between the mode selection positions. In this case, since the scroll line does not emit light in the process of moving between the mode selection positions and emits light when it has reached the mode selection position, it can be easily recognized that the scroll line has reached the predetermined mode selection position.

In another particular configuration, the mode execution control means displays the operation screen of the fixed operation mode in the display area of the screen of the display, and displays an operation icon included in the operation screen in an enlarged manner.

The user can thereby easily operate the desired operation icon on the operation screen displayed on the display.

In another particular configuration, the mode execution control means displays the operation screen of the fixed operation mode in the display area of the screen of the display, and displays a displaying part representing a scroll state of the operation screen, and the mode execution control means changes indication of the displaying part and scrolls the operation screen in accordance with an operation by the user.

According to this particular configuration, the operation screen displayed on the display can be easily scrolled.

Also, in another particular configuration, the mode execution control means displays the operation screen of the fixed operation mode in the display area of the screen of the display, while it displays a displaying part representing a setting of image or sound of the operation screen in the operation area of the screen of the display, and the mode execution control means changes indication of the displaying part and changes the setting of image or sound in accordance with an operation by the user.

According to this particular configuration, it is possible to, for example, easily switch the channel of the operation screen (TV screen) displayed on the display at the time of TV broadcast reception, or easily adjust sound volume.

In a further particular configuration, a jog dial for the scroll operation and the mode fixing operation is arranged in the housing.

The mode selection control means recognizes an operation of rotating the jog dial while depressing the jog dial as the scroll operation. The mode execution control means recognizes an operation of releasing the jog dial from the depression as the mode fixing operation.

Therefore, the user can make the initial screens of the plurality of operation modes displayed and switched on the display by rotating the jog dial while depressing it, and activate the desired operation mode only by releasing the jog dial from the depression when the initial screen of the desired operation mode is displayed.

Also, the mode execution control means recognizes an operation of releasing the jog dial from the depression as the mode fixing operation, and indication of the displaying part is changed in accordance with an operation of rotating the jog dial with the jog dial released from the depression.

Therefore, the user can, for example, easily switch the channel of the TV screen displayed on the display at the time of TV broadcast reception, or easily adjust sound volume by rotating the jog dial without depressing it during execution of one operation mode.

In a still further particular configuration, selection of a mode by the mode selection control means and activation of the mode by the mode execution control means can be performed for a plurality of operation modes preliminarily selected by the user from a plurality of operation modes that are preliminarily prepared.

According to this particular configuration, the plurality of operation modes to be selected and activated can be set depending on individual preference of the user. Therefore, the activation of the desired operation mode can be performed more quickly.

Effect of the Invention

With the portable terminal device according to the present invention, it is possible to find a desired function easily, and activate the function quickly.

BRIEF DESCRIPTION OF THE DRAWINGS

FIG. 4 are views for explaining switch of a music playback mode, a Web screen display mode, and a TV watching mode with a horizontally long screen;
FIG. 5 are views for explaining switch of a TV watching mode with a normal screen, a mail preparation mode, and a full keyboard mode;
FIG. 6 are views showing examples each displaying a scroll bar displaying part in a display area.

Figure 1:
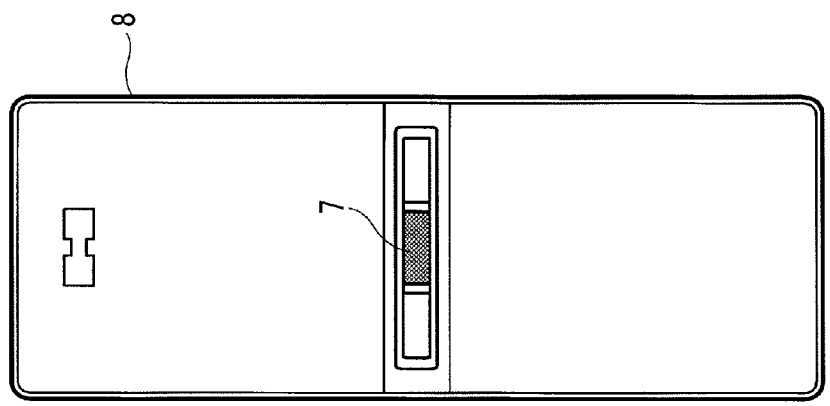
FIG. 1 are views showing a front surface and a rear surface of a portable telephone according to the present invention.
Figure 1:
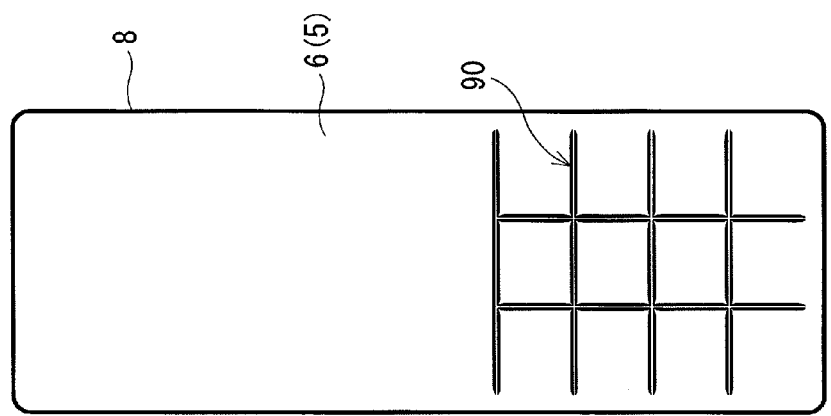

EXPLANATION OF REFERENCE NUMERALS 5 liquid crystal display
6 touch panel input unit
9 scroll line
91 display area
92 operation area

BEST MODE FOR CARRYING OUT THE INVENTION

An embodiment of the present invention in which the present invention is implemented in a portable telephone is to be described in detail below with reference to the drawings.

Figure 2:
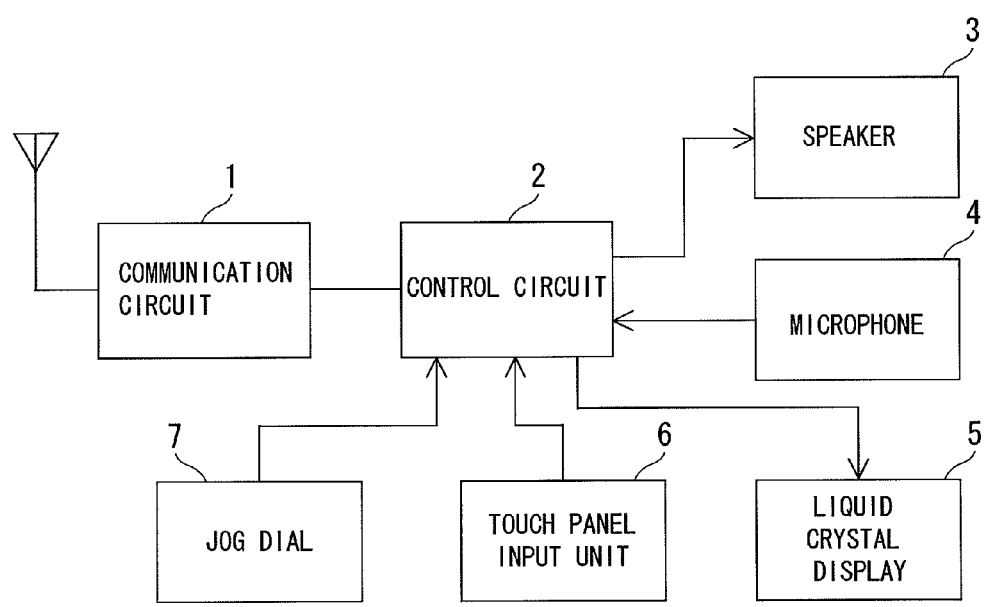
FIG. 2 is a block diagram showing a configuration of the portable telephone.

A portable telephone according to the present invention comprises a flat rectangular-parallelepiped-shaped housing 8 as shown in FIGS. 1(a) and 1(b). In the housing 8, arranged are a communication circuit 1 for telephone communication, a control circuit 2 comprising a microcomputer, a speaker 3 for outputting voice of a partner, and a microphone 4 for inputting voice of a user, as shown in FIG. 2. Also, to the control circuit 2, connected are a liquid crystal display 5 for displaying an image, a transparent touch panel input unit 6 for performing touch-input, a jog dial 7 for performing a scroll operation and a mode fixing operation to be described later.

Although the speaker 3 and the microphone 4 are arranged in both end parts of the housing 8 for a telephone call, it is also possible to arrange a pair of speakers outputting sound of TV broadcasting at locations of right and left of a screen of the liquid crystal display 5.

The liquid crystal display 5 includes the screen which is exposed to substantially entire area of a front surface of the housing 8 as shown in FIG. 1(a), and a touch panel input unit 6 is arranged so as to cover the entire area of the screen. It is possible to input by performing a touch operation while feeling as if actually touching a content displayed on the screen of the housing 8. In a lower half area of a front surface of the touch panel input unit 6, formed is a lattice-shaped groove pattern 90.

The jog dial 7 is arranged in a rear surface central part of the housing 8 as shown in FIG. 1(b), so that a depression operation and a rotation operation can be performed. Also, keys to be depressed which are operated along with the jog dial 7 depending on condition are arranged on right and left of the jog dial 7.

In the portable telephone according to the present invention, it is possible to set a music playback mode shown in FIG. 4(a), a Web screen display mode shown in FIG. 4(b), a TV watching mode with a horizontally long screen shown in FIG. 4(c), a TV watching mode with a normal screen shown in FIG. 5(a), a mail preparation mode shown in FIG. 5(b), and a full keyboard mode shown in FIG. 5(c). One operation mode is selected from the plurality of operation modes by moving up and down a scroll line 9 displayed horizontally across the screen. In the music playback mode, it is possible to play back not only music, but also music with moving images. The scroll line 9 can be moved up and down with a lattice pitch of the groove pattern 90, and it emits light when it reaches a predetermined mode selection position, and stops emitting light in a process of moving between mode selection positions.

By setting the scroll line 9 shown in FIG. 4(a) to the lower-most mode selection position, the music playback mode is selected. In the music playback mode, a display area 91 is formed above the scroll line 9, and an operation area 92 is formed below the scroll line 9.

In the display area 91, displayed are an image of a jacket representing contents of the music and moving images that are being played back, and selection icons for selecting a plurality of jackets of music or moving images that can be played back. Also, in the operation area 92, operation keys for rewind (reverse feed), playback, and fast-forward are displayed.

By performing the rotation operation of the jog dial 7 while depressing it, and setting the scroll line 9 to a mode selection position one above as shown in FIG. 4(b), the Web screen display mode is set. In the Web screen display mode, the display area 91 is formed above the scroll line 9, and the operation area 92 is formed below the scroll line 9.

In the display area 91, a Web screen is displayed and a plurality of toolbar icons included in the Web screen are displayed in an enlarged manner. Also, in the operation area 92, a plurality of operation keys for operating the Web screen are displayed.

By further performing the rotation operation of the jog dial 7 while depressing it, and setting the scroll line 9 to a mode selection position one above as shown in FIG. 4(c), the TV watching mode with the horizontally long screen is set. In the TV watching mode with the horizontally long screen, the display area 91 is formed above the scroll line 9, and the operation area 92 is formed below the scroll line 9.

In the display area 91, a TV screen is displayed laterally. Also, in the operation area 92, a plurality of operation keys for changing a TV watching condition (including a channel, sound volume, and the like) are displayed laterally.

By further performing the rotation operation of the jog dial 7 while depressing it, and setting the scroll line 9 to a mode selection position one above as shown in FIG. 5(a), the TV watching mode with the normal screen is set. In the TV watching mode with the normal screen, the display area 91 is formed above the scroll line 9, and the operation area 92 is formed below the scroll line 9.

In the display area 91, the TV screen is displayed in a normal direction. Also, in the operation area 92, a plurality of moving image thumbnails for selecting another channel are displayed.

By further performing the rotation operation of the jog dial 7 while depressing it, and setting the scroll line 9 to a mode selection position one above as shown in FIG. 5(b), the mail preparation mode is set. In the mail preparation mode, the display area 91 is formed above the scroll line 9, and the operation area 92 is formed below the scroll line 9.

In the display area 91, a prepared mail text is displayed. Also, in the operation area 92, a plurality of operation keys for inputting text are displayed.

By further performing the rotation operation of the jog dial 7 while depressing it, and setting the scroll line 9 to an upper-most mode selection position as shown in FIG. 5(c), the full keyboard mode is set. In the full keyboard mode, the display area 91 which is to be formed above the scroll line 9 is deleted, and the operation area 92 is formed below the scroll line 9, in other words, it expands in the entire screen.

In the operation area 92, displayed are the plurality of operation keys for inputting text and a part of the inputted text.

When the scroll line 9 moves to a predetermined mode selection position and one operation mode is selected by the press scroll operation of the jog dial 7 as described above, an operation image (initial screen) of the selected operation mode at the time of the mode selection is displayed on the liquid crystal display 5. However, at this point, this operation mode is in an unfixed state, and the mode operation is fixed by a subsequent release of the jog dial 7 from the depression.

The scroll operation of the jog dial 7 includes a forward direction operation and a reverse direction operation. A scroll process in a reverse direction and/or a reverse switching process of the operation mode are executed by the reverse direction scroll operation.

In the music playback mode, as shown in FIGS. 6(a) and 6(b), in the display area 91, displayed are a first scroll bar displaying part 97 for scrolling indication of a plurality of songs recorded in one album and a second scroll bar displaying part 98 for scrolling indication of a plurality of albums.

In a state where any of the selection icons of albums is not selected, or in a state where there is a selected album displayed in a large manner in the display area 91, the first scroll bar displaying part 97 becomes effective. By rotating the jog dial 7 with the jog dial 7 released from the depression, the plurality of songs are displayed and scrolled. In contrast, in a state where the selection icon of any one album is pressed to select this album, the second scroll bar displaying part 98 becomes effective. By rotating the jog dial 7 with the jog dial 7 released from the depression, indication of the plurality of albums is scrolled and another album can be selected.

Figure 7A:
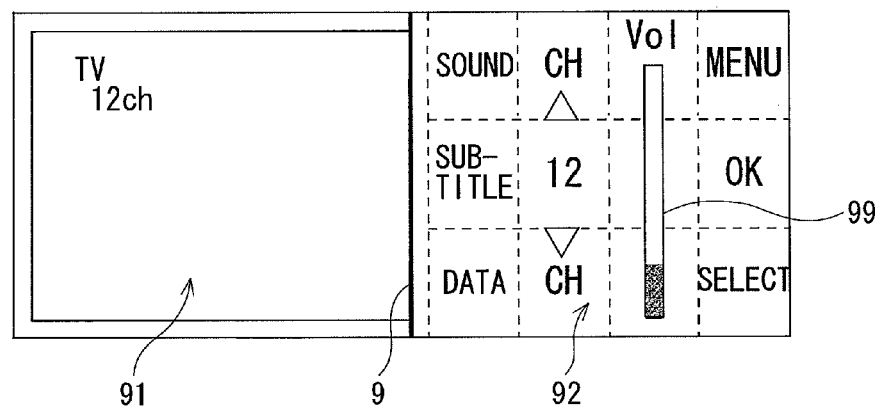
FIG. 7 are views showing examples each displaying a sound volume bar displaying part in an operation area.
Figure 7B:
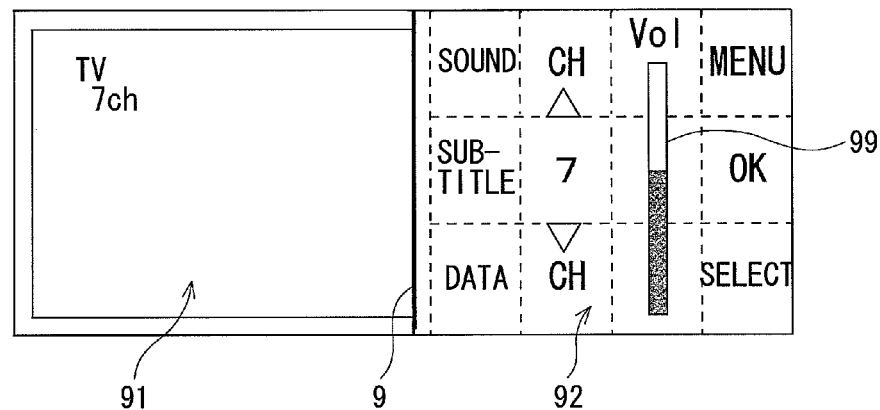

Also, in the TV watching mode with the horizontally long screen, as shown in FIGS. 7(a) and 7(b), in the operation area 92, operation keys for switching a channel is displayed, and a sound volume bar displaying part 99 for showing an adjustment value of the sound volume (magnitude of sound) is displayed. When the jog dial 7 is rotated with the jog dial released from the depression in this state, the sound volume can be adjusted.

Figure 8C:
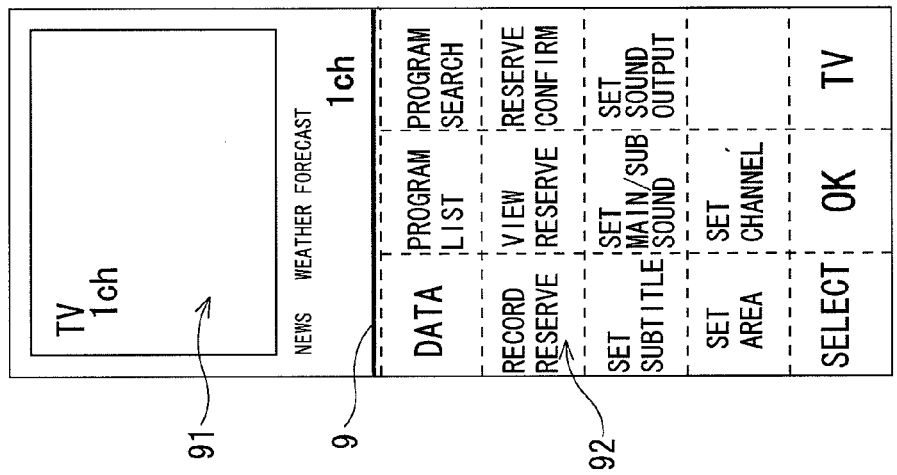
FIG. 8 are views showing examples each displaying keys for channel switch and function selection in the TV watching mode.
Figure 8B:
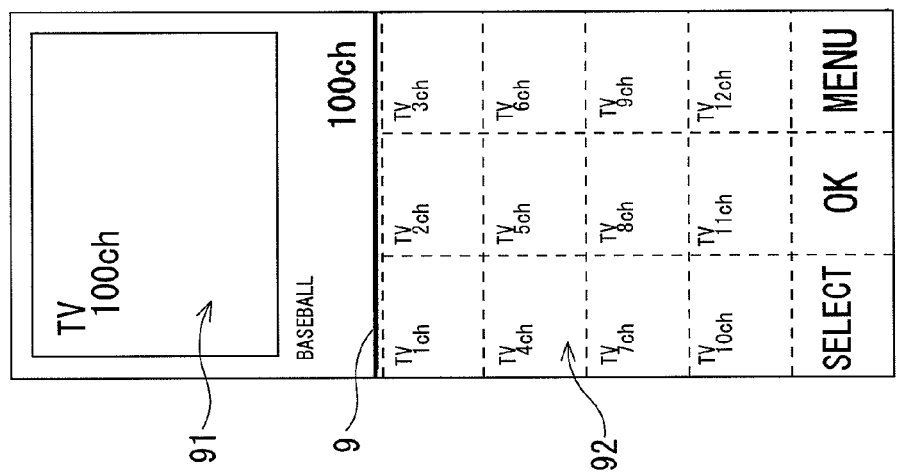
Figure 8A:
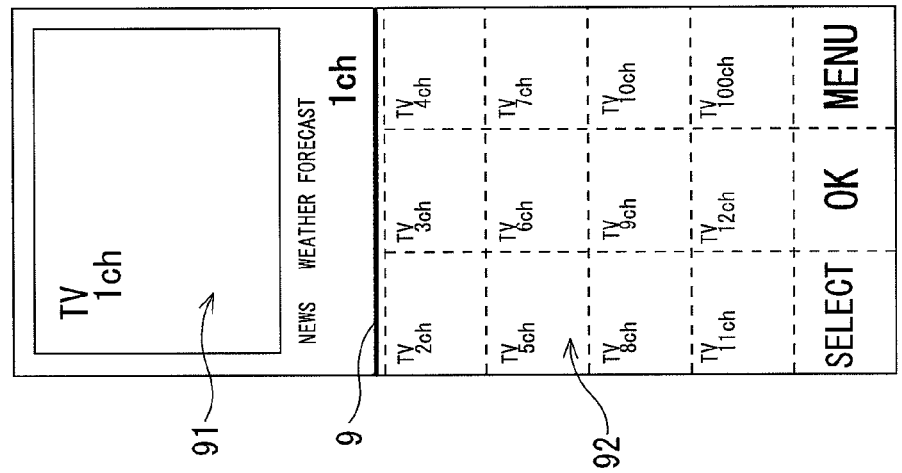

Meanwhile, in the TV watching mode with the normal screen, by performing the press operation of one desired moving image thumbnail from the plurality of moving image thumbnails displayed in the operation area 92, the channel can be switched as shown in FIGS. 8(a) and 8(b). It is also possible that when a scroll operation is performed within a predetermined time period (e.g., around five seconds to 10 seconds) after the channel switch, the operation is determined as an operation to switch the channel to another channel because the selected channel is not a desired one, or it is determined as an operation for switching to another desired channel, to select another channel.

Also, when a press operation of a "MENU" key displayed in the operation area 92 is performed, displayed are operation keys for performing function settings such as recording reservation, subtitle setting or the like as shown in FIG. 8(c). And when a press operation of "TV" key among them is performed, it returns to the channel switch screen shown in FIG. 8(a).

Figure 3:
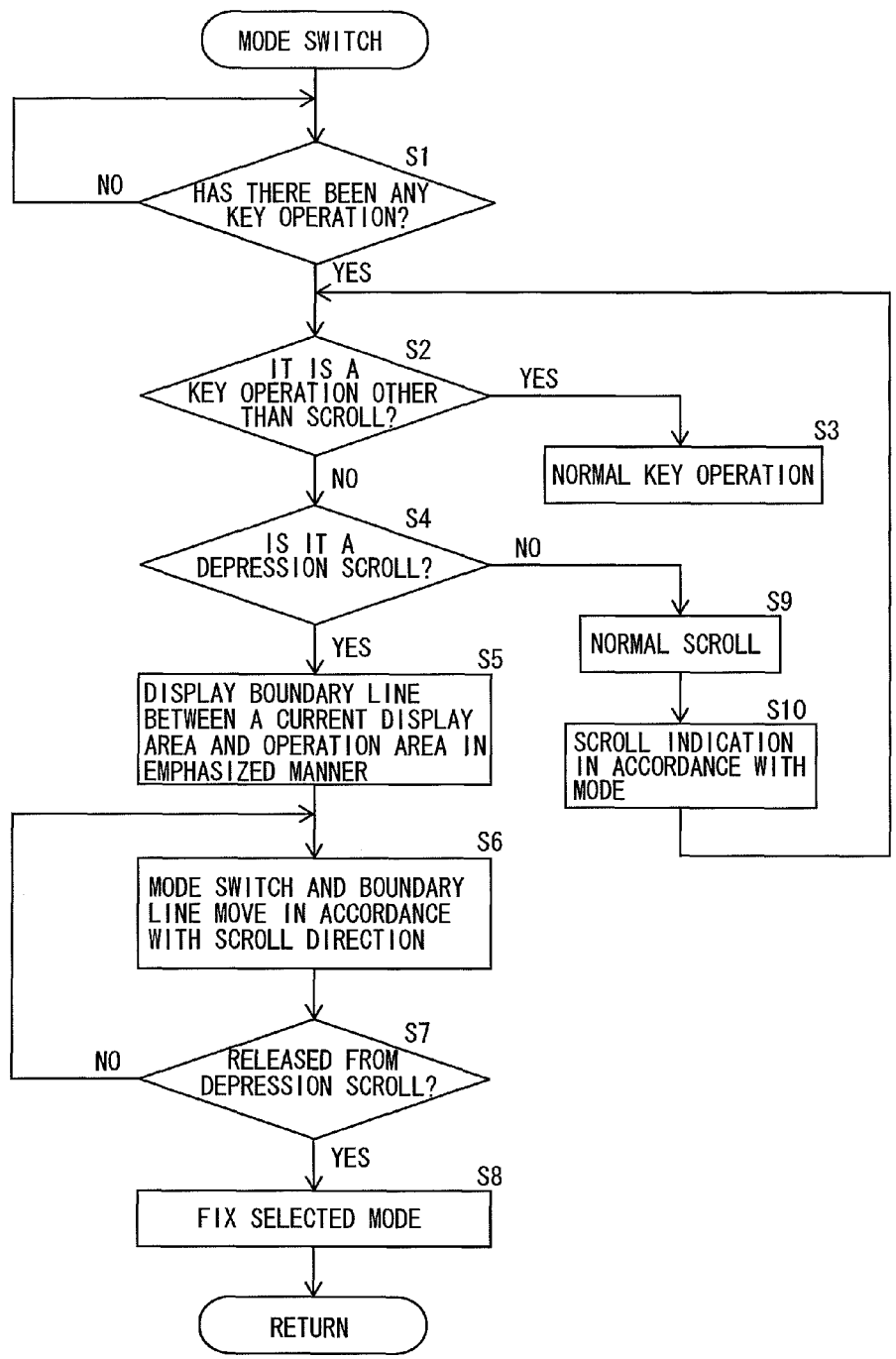
FIG. 3 is a flow chart showing a mode switch process in the portable telephone.

FIG. 3 shows a procedure for mode switch executed by the control circuit 2. First in step S1, it is determined whether or not any key operation has been performed. If it is determined YES, the flow proceeds to step S2, and it is determined whether or not that is a key operation other than the scroll operation by a rotation of the jog dial. If it is determined YES here, the flow proceeds to step S3, and a process of the normal key operation is conducted.

In contrast, if it is determined NO in step S2, the flow proceeds to step S4, and it is determined whether or not the scroll operation is a depression scroll operated in a state where the jog dial is depressed. If it is determined NO here, the flow proceeds to step S9, and the normal scroll process in the operation mode such as the channel switch or the sound volume adjustment is conducted. Further, in step S10, a scroll indication according to the mode is conducted and thereafter, the flow returns to step S2.

If the jog dial is scrolled while it is depressed and therefore it is determined YES in step S4, the flow proceeds to step S5, and a boundary line (scroll line) between a current display area and operation area is highlighted by light emission. At this time, it is also possible to emphasize more the light emission of the scroll line by changing a screen displayed together to be bleared, or decreasing brightness.

Next in step S6, mode is switched in accordance with the direction of the scroll, and the boundary line (scroll line) between the current display area and the operation area is moved.

Subsequently in step S7, it is determined whether or not the jog dial has been released from the depression scroll. If it is determined NO, the flow returns to step S6, and the mode switch and the move of the boundary line are repeated.

In contrast, if it is determined YES in step S7, the flow proceeds to step S8, and the selected mode is fixed and the mode switch process is ended.

With the above described mode switch process, executed are the mode switch by the depression scroll shown in FIGS. 4(a), 4(b), 4(c), 5(a), 5(b) and 5(c) and the operation change by the normal scroll shown in FIGS. 6 and 7.

According to the portable telephone of the present invention described above, by moving up and down the scroll line 9 displayed on the screen of the liquid crystal display 5 by the depression scroll operation of the jog dial 7, an operation mode preliminarily correlated to the position of the scroll lines 9 is selected sequentially and, the initial screens of the plurality of operation modes are displayed and switched in the display area 91 of the screen as shown in FIGS. 4 and 5. Therefore, the user can find a desired operation mode visually while watching the initial screens of the plurality of operation modes. And the user can activate the desired operation mode quickly by only releasing the jog dial 7 from the depression in a state where the initial screen of the desired operation mode is displayed.

The present invention is not limited to the foregoing embodiment in construction but can be modified variously within the technical range set forth in the appended claims. For example, for the initial screen which should be displayed at the time of mode selection, it is also possible to employ a configuration of displaying a predetermined default screen representing the content of each operation mode, as well as the configuration of displaying the operation screen at the time of the mode selection, e.g., the actual Web screen selected at the time or the actual TV screen of the channel selected at the time as described above.

Also, for the scroll line 9, not limited to the configuration of making the boundary line between the display area 91 and the operation area 92 emit light, it is also possible to employ various display configurations showing the boundary position between the display area 91 and the operation area 92.

Also, it is also possible to make the scroll line emit light during moving between the mode selection positions, and to intensify the light emission of the scroll line when it reaches the vicinity of one mode selection position or when it is passing the mode selection position. Further, when the scroll line is moving, in order to emphasize the move, it is also possible to emphasize the scroll line by controlling the entire screen such as decreasing the brightness, shading off the screen indication except the scroll line, or the like. However, it is desirable to maintain a normal display condition of indication for notifying the user with respect to a telephone function, for example, reception level, incoming call, mail reception, remaining battery level, current time, and the like even during the move of the scroll line.

Further, in the above mentioned embodiment, described is an example in which the operation mode is switched by moving the scroll line by the scroll operation of the jog dial 7. However, it is also possible to employ a structure using input by a touchpad instead of input by the jog dial 7, to realize the moving of the scroll line directly by, for example, an operation of moving the scroll line by moving fingers as if holding the scroll line, an operation of moving the scroll line by dragging the scroll line with a finger, or the like.

Furthermore, in the above mentioned embodiment, the mode fixing operation is an operation of releasing the jog dial 7 from the depression after the depression scroll operation of the jog dial 7. However, not limited to that, it is also possible to fix the operation mode by operating another key during the scroll operation of the jog dial 7.

What is claimed is:

1. A portable terminal device including a housing provided with a display arranged therein and a light-transmitting touch panel input unit arranged so as to cover a screen of the display, and capable of executing one operation mode selected by a user from a plurality of operation modes, the portable terminal device comprising:

a scroll line displaying unit configured to display on the screen of the display a scroll line extending in one direction on the screen and move the scroll line in accordance with a scroll operation by a user in a direction crossing the one direction;

a mode selection control unit configured to select one operation mode correlated to a predetermined position of the scroll line from the plurality of operation modes in accordance with the scroll operation by the user, and form a display area and an operation area with the scroll line serving as a boundary line therebetween on the screen of the display so as to display in the display area an initial screen of one selected operation mode, while to display in the operation area one or more operation keys to be used in said operation mode, the predetermined position of the scroll line, which is moved by the scroll line displaying unit, being defined to correspond with each of the plurality of operation modes; and a mode execution control unit configured to fix one selected operation mode in response to a mode fixing operation by the user made in a state where one operation mode is selected, execute a predetermined process of the operation mode in response to an operation of an operation key displayed in the operation area, and display an operation screen in the display area.

2. The portable terminal device according to claim 1, wherein the scroll line can be moved to a plurality of mode selection positions set preliminarily on the screen of the display, and the mode selection control unit provides a visual difference between display state of the scroll line when the scroll line reaches one mode selection position and display state of the scroll line moving between the mode selection positions.

3. The portable terminal device according to claim 2, wherein the mode selection control unit makes the scroll line emit light when the scroll line reaches one mode selection position, and makes the scroll line stop emitting light during moving between the mode selection positions.

4. The portable terminal device according to claim 1, wherein the mode execution control unit displays the operation screen of the fixed operation mode in the display area of the screen of the display, and displays an operation icon included in the operation screen in an enlarged manner.

5. The portable terminal device according to claim 1, wherein the mode execution control unit displays the operation screen of the fixed operation mode in the display area of the screen of the display, and displays a displaying part representing a scroll state of the operation screen, and the mode execution control unit changes indication of the displaying part and scrolls the operation screen in accordance with an operation by the user.

6. The portable terminal device according to claim 1, wherein the mode execution control unit displays the operation screen of the fixed operation mode in the display area of the screen of the display, while it displays a displaying part representing a setting of image or sound of the operation screen in the operation area of the screen of the display, and the mode execution control unit changes indication of the displaying part and changes the setting of image or sound in accordance with an operation by the user.

7. The portable terminal device according to claim 1, wherein a jog dial for the scroll operation and the mode fixing operation is arranged in the housing, the mode selection control unit recognizes an operation of rotating the jog dial while depressing the jog dial as the scroll operation, and the mode execution control unit recognizes an operation of releasing the jog dial from the depression as the jog dial as the mode fixing operation.

8. The portable terminal device according to claim 5, wherein a jog dial for the scroll operation and the mode fixing operation is arranged in the housing, the mode selection control unit recognizes an operation of rotating the jog dial while depressing the jog dial as the scroll operation, the mode execution control unit recognizes an operation of releasing the jog dial from the depression as the mode fixing operation, and indication of the displaying part is changed in accordance with an operation of rotating the jog dial with the jog dial released from the depression.

9. The portable terminal device according to claim 1, wherein selection of an operation mode by the mode selection control unit and activation of the operation mode by the mode execution control unit can be performed for a plurality of operation modes preliminarily selected by the user from a plurality of operation modes that are preliminarily prepared.

* * * * *